United States Patent
Beno et al.

(10) Patent No.: US 10,584,651 B2
(45) Date of Patent: Mar. 10, 2020

(54) COMPRESSOR OVERRIDE CONTROL

(71) Applicant: GARRETT TRANSPORTATION INC., Torrance, CA (US)

(72) Inventors: Radek Beno, Brumov-Bylnice (CZ); Daniel Pachner, Prague (CZ)

(73) Assignee: GARRETT TRANSPORTATION I INC., Torrance, CA (US)

(*) Notice: Subject to any disclaimer, the term of this patent is extended or adjusted under 35 U.S.C. 154(b) by 3 days.

(21) Appl. No.: 15/658,333

(22) Filed: Jul. 24, 2017

(65) Prior Publication Data
US 2018/0023490 A1     Jan. 25, 2018

Related U.S. Application Data

(60) Provisional application No. 62/366,513, filed on Jul. 25, 2016.

(51) Int. Cl.
*F02D 41/00*     (2006.01)
*F02D 41/24*     (2006.01)
(Continued)

(52) U.S. Cl.
CPC .......... *F02D 41/0007* (2013.01); *F02B 33/40* (2013.01); *F02B 37/12* (2013.01);
(Continued)

(58) Field of Classification Search
CPC .... F02B 2037/125; F02B 33/00; F02B 33/40; F02B 37/00; F02D 2200/0406;
(Continued)

(56) References Cited

U.S. PATENT DOCUMENTS 6,871,498 B1    3/2005    Allen et al.
7,571,607 B2    8/2009    Vrbas
(Continued)

FOREIGN PATENT DOCUMENTS

WO    2015157496 A1    10/2015

OTHER PUBLICATIONS

Extended European Search Report for EP Application No. 17183172.0 dated Dec. 15, 2017.
(Continued)

*Primary Examiner* — Carl C Staubach
(74) *Attorney, Agent, or Firm* — Seager, Tufte & Wickhem, LLP

(57) ABSTRACT

An engine system incorporating an intake manifold, a compressor, and a controller. The compressor may provide air to the intake manifold and the controller may be connected to the intake manifold and the compressor. The controller may receive a control signal and control air flow from the compressor to the intake manifold based on the received control signal. The controller may control the air flow from the compressor to the intake manifold based on a first equation when a value related to the control signal is on a first side of a threshold and according to a second equation when the value is on a second side of the threshold. The controller may control the air flow between the compressor and intake manifold according to the second equation to prevent the compressor from operating at a surge condition when controlling the air flow according to the first equation.

13 Claims, 9 Drawing Sheets

(51) Int. Cl.

| | |
|---|---|
| *F02D 41/26* | (2006.01) |
| *F04D 27/02* | (2006.01) |
| *F02B 33/40* | (2006.01) |
| *F02B 37/18* | (2006.01) |
| *F02B 37/12* | (2006.01) |
| *F02M 35/104* | (2006.01) |
| *F02B 33/00* | (2006.01) |
| *F02D 41/18* | (2006.01) |
| *F02D 41/14* | (2006.01) |

(52) U.S. Cl.
CPC .......... *F02B 37/18* (2013.01); *F02D 41/2422* (2013.01); *F02D 41/26* (2013.01); *F04D 27/02* (2013.01); *F04D 27/0284* (2013.01); *F02B 33/00* (2013.01); *F02B 2037/125* (2013.01); *F02D 41/18* (2013.01); *F02D 2041/1433* (2013.01); *F02D 2200/0402* (2013.01); *F02D 2200/0406* (2013.01); *F02D 2200/0414* (2013.01); *F02D 2200/602* (2013.01); *F02D 2200/703* (2013.01); *F02M 35/104* (2013.01); *Y02T 10/144* (2013.01)

(58) Field of Classification Search
CPC ......... F02D 2200/602; F02D 2200/703; F02D 41/0007; F02D 41/2422; F02D 41/26; F02M 35/104; F04D 27/02; F04D 27/0284
See application file for complete search history.

(56) References Cited

U.S. PATENT DOCUMENTS

| | | | |
|---|---|---|---|
| 8,434,305 B2 | 5/2013 | Donkin et al. | |
| 9,719,518 B2 | 8/2017 | Mohtar et al. | |
| 2012/0291432 A1* | 11/2012 | Ulrey | F02B 37/16 60/611 |
| 2015/0051762 A1* | 2/2015 | Banker | B60W 10/06 701/22 |
| 2015/0292443 A1* | 10/2015 | Arslanturk | F02D 41/0007 60/605.2 |
| 2016/0047338 A1* | 2/2016 | Ossareh | F02B 37/16 123/568.11 |
| 2016/0061102 A1* | 3/2016 | Sugiyama | F02B 37/04 60/611 |
| 2016/0061104 A1* | 3/2016 | Hirayama | F02D 41/12 60/602 |
| 2016/0222874 A1* | 8/2016 | Almkvist | F02B 37/025 |
| 2017/0074180 A1* | 3/2017 | Hellstrom | F02D 41/0007 |
| 2017/0138278 A1* | 5/2017 | Xiao | F02D 41/005 |
| 2017/0145907 A1* | 5/2017 | Nishio | F02D 41/0007 |
| 2017/0234247 A1* | 8/2017 | Ohisa | F02P 5/1516 701/103 |

OTHER PUBLICATIONS

BorgWarner, "Design and Function of a Turbocharger: Turbine," 3 pages, Downloaded from http://www.turbos.bwauto.com/products/turbochargerTurbine.aspx, Sep. 9, 2017.

* cited by examiner

COMPRESSOR OVERRIDE CONTROL

This application claims the benefit of U.S. Provisional Application Ser. No. 62/366,513, filed Jul. 25, 2016. U.S. Provisional Application Ser. No. 62/366,513, filed Jul. 25, 2016, is hereby incorporated by reference.

BACKGROUND

The present disclosure pertains to internal combustion engines and particularly to engines having one or more compressors.

SUMMARY

This disclosure reveals an engine system, a controller, and an approach for controlling an engine system. The engine system may incorporate an intake manifold, a compressor, and/or a controller. The compressor may provide air to the intake manifold and the controller may be connected to the intake manifold and the compressor. The controller may receive a control signal and control air flow from the compressor to the intake manifold based on the received control signal. The controller may control the air flow from the compressor to the intake manifold based on a first equation when a value related to the control signal is on a first side of a threshold and according to a second equation when the value is on a second side of the threshold. The controller may control the air flow between the compressor and intake manifold according to the second equation to prevent the compressor from operating at a surge condition when controlling the air flow according to the first equation.

The above summary is not intended to describe each disclosed embodiment or every implementation of the present disclosure. The Figures, and Detailed Description, which follow, more particularly exemplify some of these embodiments.

Figure 1:
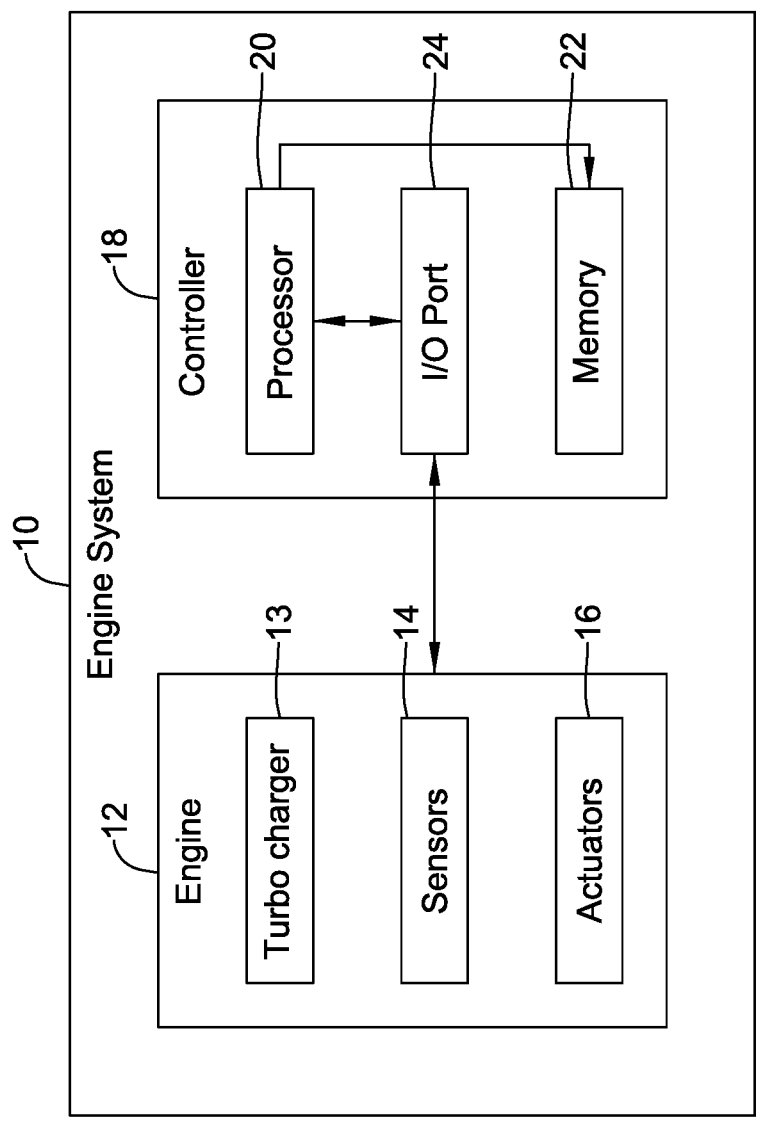
FIG. 1 is a schematic diagram of an illustrative engine system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Compressors (e.g., radial compressors) may be used in the automotive industry in supercharged and/or turbocharged internal combustion engines. Compressor surge is a phenomenon related to these compressors. Operating a compressor in a surge region of operation may be a serious problem because it may mechanically damage the compressor blades (e.g., a compressor fan), among other parts of the compressor or engine.

Compressor surge may happen when the compressor outlet pressure exceeds a certain limit which depends on the compressor speed. A surge line characterizing this limit may be represented by a curve in a compressor map provided by the compressor manufacturer. The area to the left of the surge line is a region of flow instability and operation of the compressor in this area is undesirable. From the control point of view it may be desirable to control the compressor speed and/or the pressures adjacent the compressor in order to stay in a stable flow region (e.g., to the right of and below the surge line) of the compressor map.

Flow instability may lead to pressure waves which impose vibrations and mechanical stress to the compressor blades leading to their failure. The pressure waves may be in the range of audible frequencies and may cause the characteristic chattering noise of the turbocharged engines during gear changes and/or at other times if the surge protection system does not work properly.

A scenario leading to compressor surge may be when the throttle valve controlling air flow to the intake manifold is quickly closed and the compressor is rotating at high speeds. Because of energy caused by the turbocharger inertia rotation, the speed of the compressor may not change nearly as quickly as the air flow when the throttle valve is closed. That is, the compressor may continue to pump air towards the closed throttle valve. As a result, the pressure downstream of the compressor may surge and cause the compressor to operate an operation point beyond the surge limit. This situation may occur, for example, when the gas pedal is released to change gear after a period of the throttle valve being open (e.g., after a period of vehicle acceleration) during which the compressor may reach high rotational speeds.

Compressor surge may be addressed by using a blow-off valve or compressor recirculation valve (RCV) (e.g., a pop-valve that may be considered an extra piece of hardware) which releases the air from the compressor outlet back to the compressor inlet bypassing the compressor. When a blow-off valve or an RCV is included in an engine system, a blow-off valve opening or an RCV opening may be mechanically activated by a pressure decrease downstream of the throttle valve. When closing the throttle valve, the pressure at the throttle valve outlet may decrease to below an ambient pressure around the engine system or pressure on a downstream side of the blow-off valve or RCV (e.g., an inlet to the compressor). The pressure differential between the throttle valve outlet and the ambient pressure or pressure downstream of the blow-off valve or RCV may be used to open the blow-off valve or the RCV. In such cases, connecting a compressor inlet with a compressor outlet via the blow-off valve or the RCV may reduce the compressor pressure ratio to one (1) or near to one (1) to avoid the pressure surge. During normal engine operation the blow-off valve or the RCV may be closed and may be opened only during short periods of time when avoiding the compressor surge.

Another approach for preventing compressor surge may be based on controlling how the throttle valve closes to ensure that an air flow decrease across the throttle valve would follow or be proportional to a compressor speed decrease. As a result, the throttle valve may not close immediately in response a request to close the throttle valve. Instead, the throttle valve may be closed at a delayed rate in a linear or exponential manner. A benefit of this approach may include reducing parts and costs as a blow-off valve or RCV may not be needed in the engine system. Moreover, if a blow-off valve and/or an RCV may not be needed, failures of blow-off valves and/or RCVs may be avoided. However, this approach may require an extensive calibration effort to specify the maximum throttle closing rate as a function of various parameters, primarily the engine speed, gear ratio, and so on.

Alternatively, as discussed in greater detail herein, it may be possible to derive a maximum throttle closing rate based on a mathematical model of the compressor flow. A systematic model based approach to reducing a throttle valve closing rate and/or adjusting other actuators to prevent compressor surge may be the subject of present disclosure.

Modern combustion engines may be complex systems with modern engine control or diagnostics systems that are model based and implemented with model based software in a controller (e.g., one or more electronic control units (ECUs) or electronic control modules (ECMs) having one or more control algorithms) of an engine system. In some cases, the present control algorithm (e.g., the systematic approach) may be a part of an ECM or ECU controller.

Turning to the Figures, FIG. 1 depicts an engine system 10. The engine system 10 may include an engine 12 and a controller 18 in communication with the engine 12. In some cases, the engine system 10 may include one or more additional components, including, but not limited to, a powertrain that may incorporate the engine 12, a powertrain controller, an exhaust gas aftertreatment system/mechanism, a drivetrain, a vehicle, and/or other component. Any reference herein to engine, powertrain, or aftertreatment system may be regarded as a reference to any other or all of these components.

The engine 12 may include one or more turbo chargers 13, one or more sensors 14, and one or more actuators 16. Examples of engine actuators 16 may include, but are not limited to actuators of a turbocharger waste gate (WG), a variable geometry turbocharger (VGT), an exhaust gas recirculation (EGR) system, a start of injection (SOI) system, a throttle valve (TV), and so on. The sensors 14 may be configured to sense positions of actuators and/or values of other engine variables or parameters and then communicate those values to the controller 18.

The controller 18 may be an ECM or ECU with a control system algorithm therein. The controller 18 may include one or more components having a processor 20, memory 22, an input/output (I/O) port 24, and/or one or more other components. The memory 22 may include one or more control system algorithms and/or other algorithms and the processor 20 may execute instructions (e.g., software code or other instructions) related to the algorithm(s) in the memory 22. The I/O port 24 may send and/or receive information and/or control signals to and/or from the engine 12. In one example, the I/O port 24 may receive values from the sensors 14 and/or send control signals from the processor 20 to the engine 12.

Figure 2:
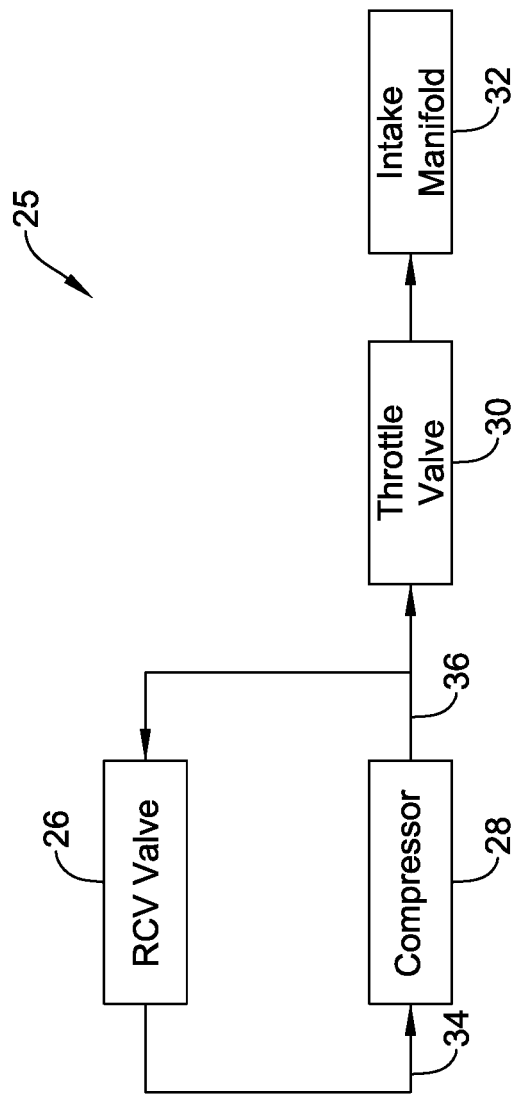
FIG. 2 is a schematic diagram of an illustrative air inlet system of an engine.

FIG. 2 is a schematic illustration of an air inlet system 25 that may, for example, be used in combination with any suitable gasoline and/or diesel-powered engine. It may be appreciated that in some cases the air inlet system 25 may include additional components not shown in FIG. 2. The air inlet system 25 depicted in FIG. 2 may incorporate an RCV 26 connected to an inlet flow of air to a compressor 28 and an outlet flow from the compressor 28. The air inlet system 25 may further include a throttle valve 30 positioned upstream of an intake manifold 32, where the throttle valve 30 may control air flow access to the intake manifold 32 by opening and closing. Air entering the intake manifold 32 may be mixed with fuel and fed into a combustion chamber of the engine system 10 via one or more intake valve disposed atop each engine cylinder. In some engine systems 10, known as direct injection engines, fuel may be directly injected into each engine cylinder. In these engine systems 10, fuel may not be mixed with air within the air intake manifold 32 itself.

In some cases, the throttle valve 30 may be opened further, to provide additional air, or at least partially closed, to provide less air, in response to a throttle command signal emanating from the controller 18 and/or accelerator actuator. The controller 18 may provide a command signal to change the position of the throttle valve 30 in response to the driver pushing harder on the acceleration actuator (e.g., accelerator pedal), or perhaps reducing force on the acceleration actuator. In some cases, the controller 18 may provide a throttle command signal to change the position of the throttle valve 30 in order to maintain a desired speed in response to a cruise control system (not shown). While the controller 18 may be generally referenced herein as a unitary control structure, it will be appreciated that in actuality, the controller 18 may include a number of distinct computers, controllers, processors, sensors, and the like.

Moving upstream in the illustrative air inlet system 25, air entering the air inlet system 25 may be provided to the compressor 28 of a turbo charger (e.g., the turbo charger 13 or other turbo charger). The compressor 28 may include an air inlet 34 and an air outlet 36. It may be appreciated that the compressor 28 may be disposed within the air intake flow. The turbocharger may also include a drive turbine (not shown) that is disposed within an exhaust gas flow of the engine. Gases within the exhaust flow may cause the drive turbine to rotate. The drive turbine may drive the compressor 28 via a compressor drive shaft. The compressor 28, which may be disposed within the air intake flow, may rotate via the aforementioned shaft. As the compressor 28 rotates, it may draw air through the air inlet 34, compress the air, and provide the compressed air to the air outlet 36. Air entering the compressor 28 at the air inlet 34 may be at or close to ambient pressure, while air exiting the compressor 28 at the air outlet 36 may be at an increased pressure relative to ambient pressure. The air passing through the compressor 28 may be heated as a result of being compressed, as well through some engine heating. Accordingly, in some cases, while not required, a charge air cooler (not shown) may be disposed downstream of the compressor 28 in order to cool the air before it reaches the throttle valve 30 and the air intake manifold 32 of the engine system. The charge air cooler, when provided, may cool the compressed air provided by the compressor 28 in order to provide a denser intake charge into the engine, which can increase the power output of the engine.

In operation of the air inlet system 25, the compressor 28 (e.g., a fan thereof) and the throttle valve 30 may increase rotational speed and open, respectively, in response to actuation of an acceleration actuator (e.g., accelerator pedal or other accelerator actuator) to provide air flow to the intake manifold 32. When the accelerator actuator is released, the throttle valve 30 may close and the speed of the fan of the compressor 28 may decrease. However, when the accelerator actuator is quickly released, and/or at other times, the throttle valve 30 may close faster than the fan of the compressor 28 may be able to slow down. In such instances, for example, a pressure upstream of the throttle valve 30 and downstream of the compressor 28 (e.g., at the air outlet 36) may increase to a level greater than a pressure a maximum allowed pressure of the compressor 28 (e.g., a maximum pressure for the compressor 28 at which higher pressure may damage the compressor 28). Then, due to the pressure differential at the downstream side of the throttle valve 30 and ambient conditions or upstream conditions, the RCV 26 may be actuated to an open position and excess flow upstream of the closed throttle valve 30 may be vented to the air inlet 34 of the compressor 28 until a pressure ratio of a pressure at the air outlet 36 of the compressor 28 to a pressure at the air inlet 34 of the compressor 28 may be, or may be about, equal to one (1). Such operation of the RCV 26 may provide protection to the air inlet system 25 against compressor surge.

Figure 3:
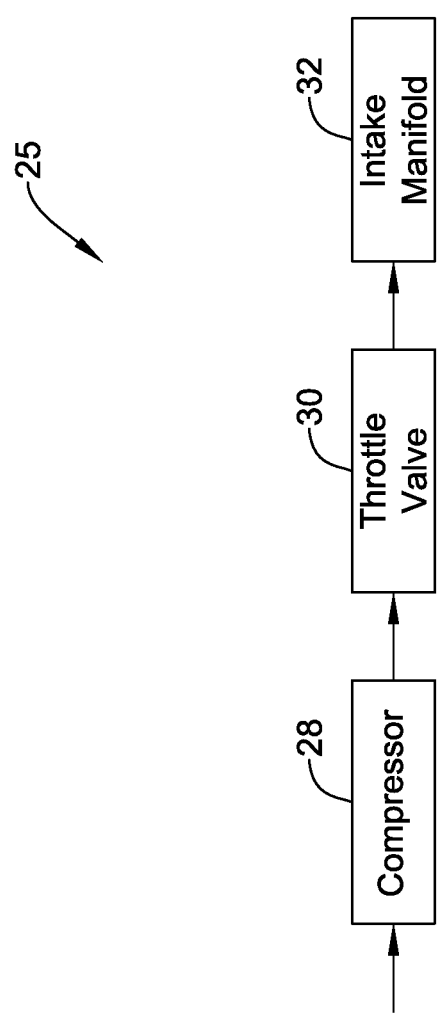
FIG. 3 is a schematic diagram of an illustrative air inlet system of an engine.

FIG. 3 depicts a schematic illustration of the air inlet system 25 having the compressor 28, the throttle valve 30, and the intake manifold 32, without the RCV 26 depicted in the air inlet system 25 of FIG. 2. When the air inlet system 25 may be without the RCV 26 (and optionally when the engine system 10 may include the RCV 26), compressor surge may be mitigated by controlling (e.g., with the controller 18 or other controller) a rate at which the throttle valve 30 closes in response to an acceleration actuator being released.

Figure 4:
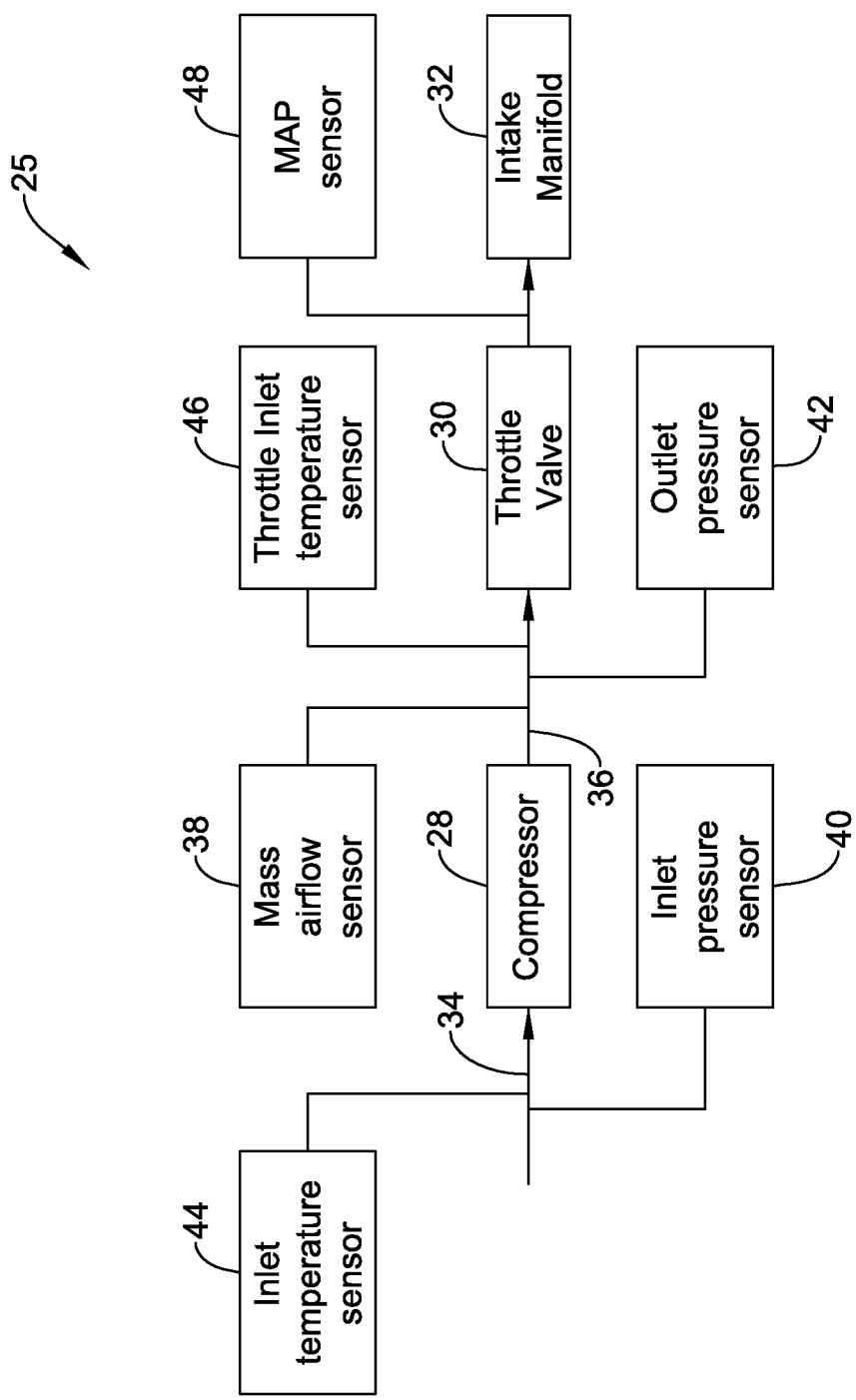
FIG. 4 is a schematic diagram of an illustrative air inlet system of an engine.

FIG. 4 provides another view of the illustrative air inlet system 25 of FIGS. 2 and 3, with several sensors added as part of the engine management system. In some cases, a mass airflow sensor 38 that provides a mass flow rate for air outputted from the compressor 28 may be utilized by an engine management system to determine an operation point of the compressor 28 on a compressor map relative to a surge line. Although the mass air flow sensor 38 is depicted in FIG. 4 as being located on an output side of the compressor 28, the mass air flow sensor 38 may be located on either side of the compressor 28. In addition to or as an alternative to using a physical mass flow sensor, a virtual mass flow sensor may be utilized based on inputs to the controller 18.

An inlet pressure sensor 40 may provide an indication of the air pressure upstream of the compressor 28. In some cases, this may provide an indication of ambient air pressure, but it will be recognized that ambient air pressure can vary with weather systems, altitude, temperature and other factors. An outlet pressure sensor 42 may provide an indication of the air pressure upstream of the compressor 28.

The air inlet system 25 may include one or more temperature sensors. An inlet temperature sensor 44 may provide an indication of an air temperature of the air entering the compressor 28. In the example shown, a throttle inlet temperature sensor 46 may provide an indication of the temperature of the air within the air inlet system 25 downstream of the compressor 28, near an air inlet of the throttle valve 30. Other temperature sensors may be included as desired.

The air inlet system 25 may include a Manifold Absolute Pressure (MAP) sensor 48 that provides an indication of air pressure downstream of the throttle valve 30, such as at or in the intake manifold 32 of the engine. The MAP sensor 48 is commonly used on many modern engines for controlling the operation of the engine, such as controlling the operation of the fuel injectors (if present), engine timing, turbo speed, and/or other engine parameters.

Figure 5:
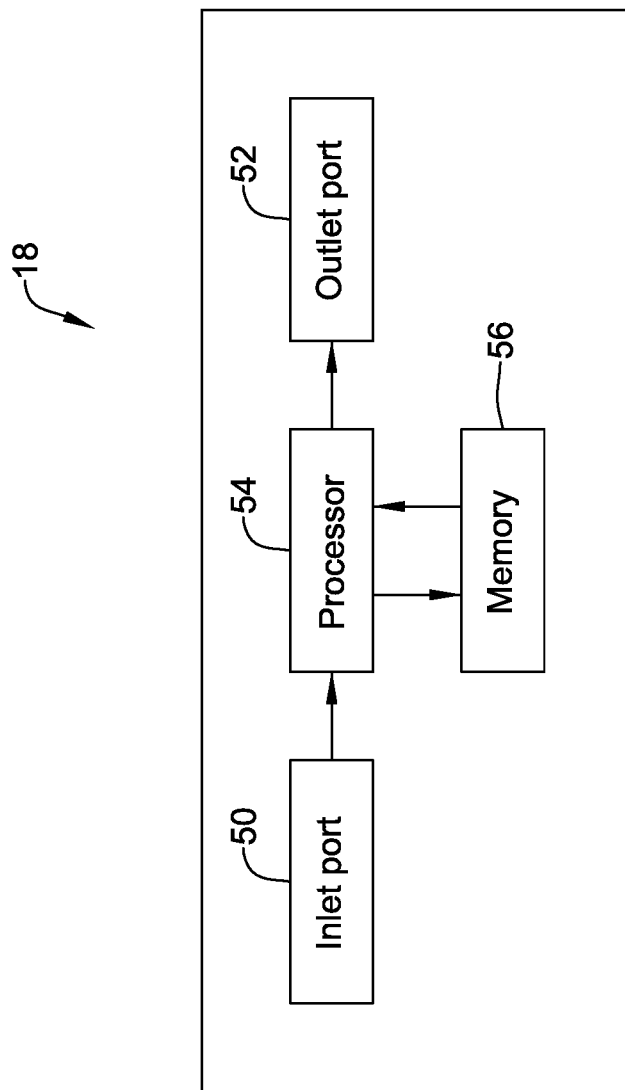
FIG. 5 is a schematic diagram of an illustrative controller.

FIG. 5 is a schematic diagram of the controller 18 that may be used in combination with the engine system 10 of FIG. 1 and/or the air inlet system 25 of FIGS. 2-4 to process the parameters referenced herein to control air flow from the compressor 28 to the intake manifold 32 of the engine 12. In some cases, the controller 18 may be a standalone controller or computer. In some cases, the controller 18 may be manifested as a component of the aforementioned engine management system.

The controller 18 may include an inlet or input port 50 and an outlet or output port 52. A processor 54 may be operatively coupled to the input port 50 and to the output port 52. A memory 56 may be coupled to the processor 54 and may, for example, store instructions (e.g., in a non-transitory state) that are executable by the processor 54 to control airflow from the compressor 28 to the intake manifold 32 of the engine 12.

Figure 6:
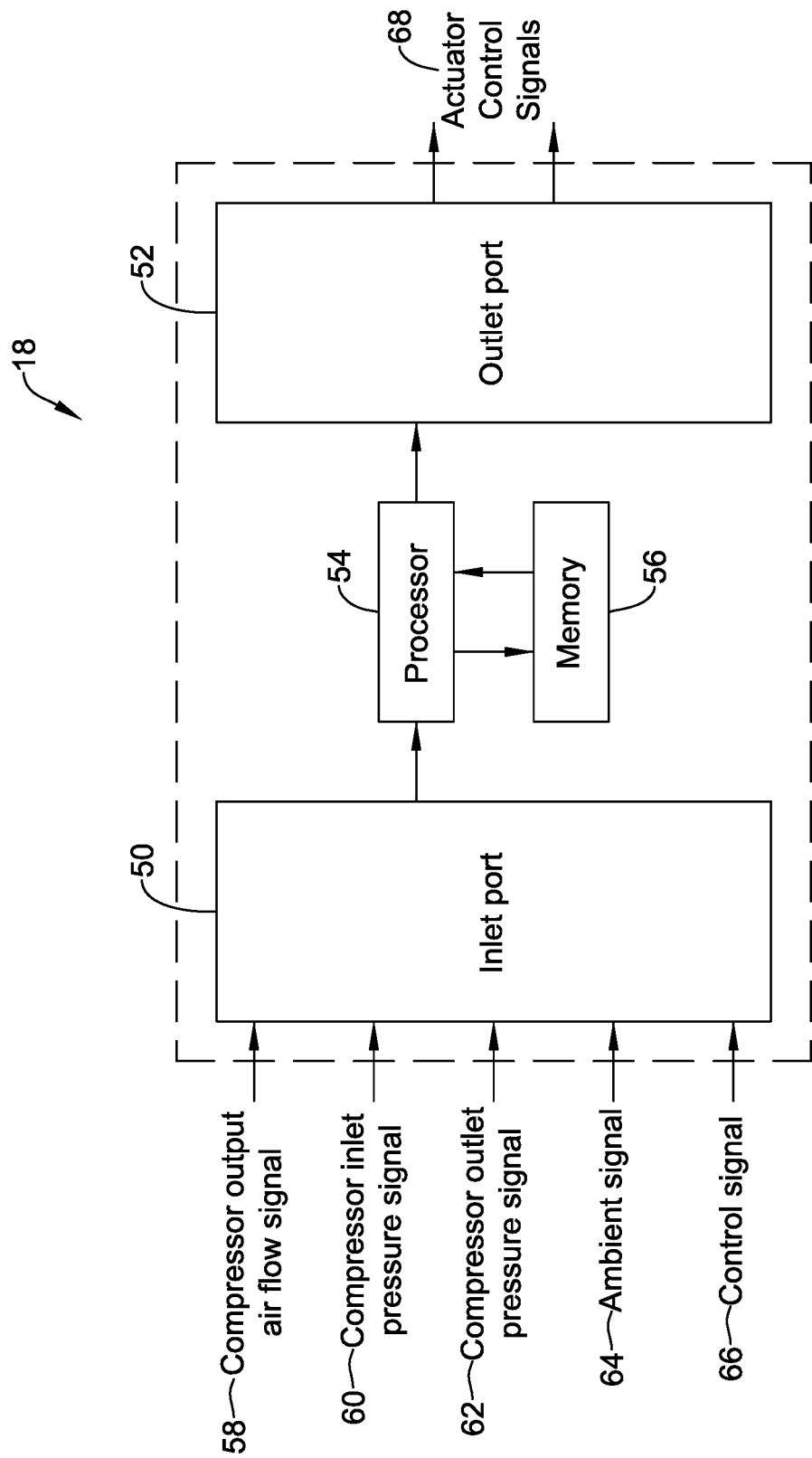
FIG. 6 is a schematic diagram of an illustrative controller with illustrative inputs and outputs.

In FIG. 6, it can be seen that there may be one or more inputs to the input port 50. For example, the inputs to the input port 50 may include a compressor output air flow signal 58 (e.g., from the mass air flow sensor 38 or other air flow sensor) representing a measure of air flow through the compressor 28, a compressor inlet pressure signal 60 (e.g., from the inlet pressure sensor 40 or other pressure sensor) representing a measure of pressure at the air inlet 34 of the compressor 28, a compressor outlet pressure signal 62 (e.g., from the outlet pressure sensor 42 or other pressure sensor) representing a measure of pressure at the air outlet 36, ambient signals 64 (e.g., from ambient sensors including, but not limited to, ambient temperature sensors, ambient pressure sensors, and so on), control signals 66 (e.g., control signals from an acceleration actuator or pedal, and so forth), and/or other inputs. In some cases, the processor 54 may determine a value related to the control signal 66 based on a plurality of the inputs.

In some cases, the processor 54 of the controller 18 may determine the value related to the control signal and compare the value to a threshold. When the processor 54 determines the value related to the control signal 66 is on a first side of the threshold, the processor 54 may provide, via the output port 52, one or more actuator control signals 68 (e.g., waste gate actuator control signals, throttle valve 30 control signals, and so on) according to a first equation. When the processor 54 determines the value related to the control signal 66 is on a second side of the threshold, the processor 54 may provide, via the output port 52, one or more actuator control signals 68 (e.g., waste gate actuator control signals, throttle valve 30 control signals, and so forth) according to a second equation.

The value may be any value of a parameter related to a control signal from a user (e.g., an acceleration actuator control signal). In some cases, the value determined by the controller 18 may be dependent on a flow rate of air flow from the compressor to the engine and a pressure ratio of a pressure at an output of the compressor over a pressure at an input of the compressor, which may be indicative of whether the compressor 28 may operate at a surge condition. Alternatively or in addition, the value may be based on one or more other values inputted to the controller 18. In one example, the value may be one or more of (or a function of) a distance from a surge line (σ), an operating point of the compressor on a compressor map, a rate of change of a throttle valve position, an engine deceleration rate, a rate of change of a position of an acceleration actuator, a compressor speed, a pressure downstream of the compressor, the flow rate of air flow through the compressor, ambient temperature and/or pressure, and so forth The threshold may be any value related to a surge line of the compressor (e.g., a surge line on a compressor may of air flow from the compressor to the intake manifold versus a pressure ratio of a pressure at an output of the compressor 28 over a pressure at an input of the compressor 28) and parameterized relative to or otherwise related to the determined value, and is developed in greater detail below.

Further, the value may comprise a value (e.g., an actuator value) at time t and/or a predicted value at time t+N, where t is a current time and t+N is a time in the future (e.g., N may be a selected time delta between a first instance and a second instance). Predicting a value at time t+N may be indicative of a compressor operating condition in the future and may facilitate preventing the compressor 28 from operating at a surge condition by allowing time for the controller 18 to prevent a surge condition.

When the controller 18 is controlling the air flow from the compressor 28 to the intake manifold 32 based on a first equation and a second equation, the first equation may be considered to be a default equation for controlling actuators (e.g., the throttle valve, the waste-gate, and so on) in response to adjusted acceleration actuator positions provided by a user (e.g., a user steps on a drive pedal) during operation of the engine system 10 when the controller 18 is not indicating the compressor 28 will operate at a surge condition. The second equation may be considered to be an override equation for controlling the actuators in response to adjusted acceleration actuator positions provided by the user during operation of the engine system 10 when the controller is indicating the compressor will operate at a surge condition. The second equation may be utilized to prevent the surge condition when using the first equation would otherwise fail to do so. That is, for the same inputted control signal from an acceleration actuator, the controller 18 may control a position of the throttle valve 30 or other actuator differently when controlling air flow from the compressor 28 to the intake manifold 32 according to the second equation than when controlling air flow from the compressor 28 to the intake manifold 32 according to the first equation. In one example, the throttle valve 30 may be closed slower when using than the second equation than when using the first equation to control a position of the throttle valve 30.

As such, a systematic model based approach for providing surge protection to the compressor 28 and the engine system 10 may be utilized and implemented in the controller 18. In this approach, as discussed above and further discussed below, the controller 18 may control a position of the throttle valve 30 and/or other actuators such that the compressor 28 does not operate at a point on a surge side of a surge limit (e.g., the threshold).

Figure 7:
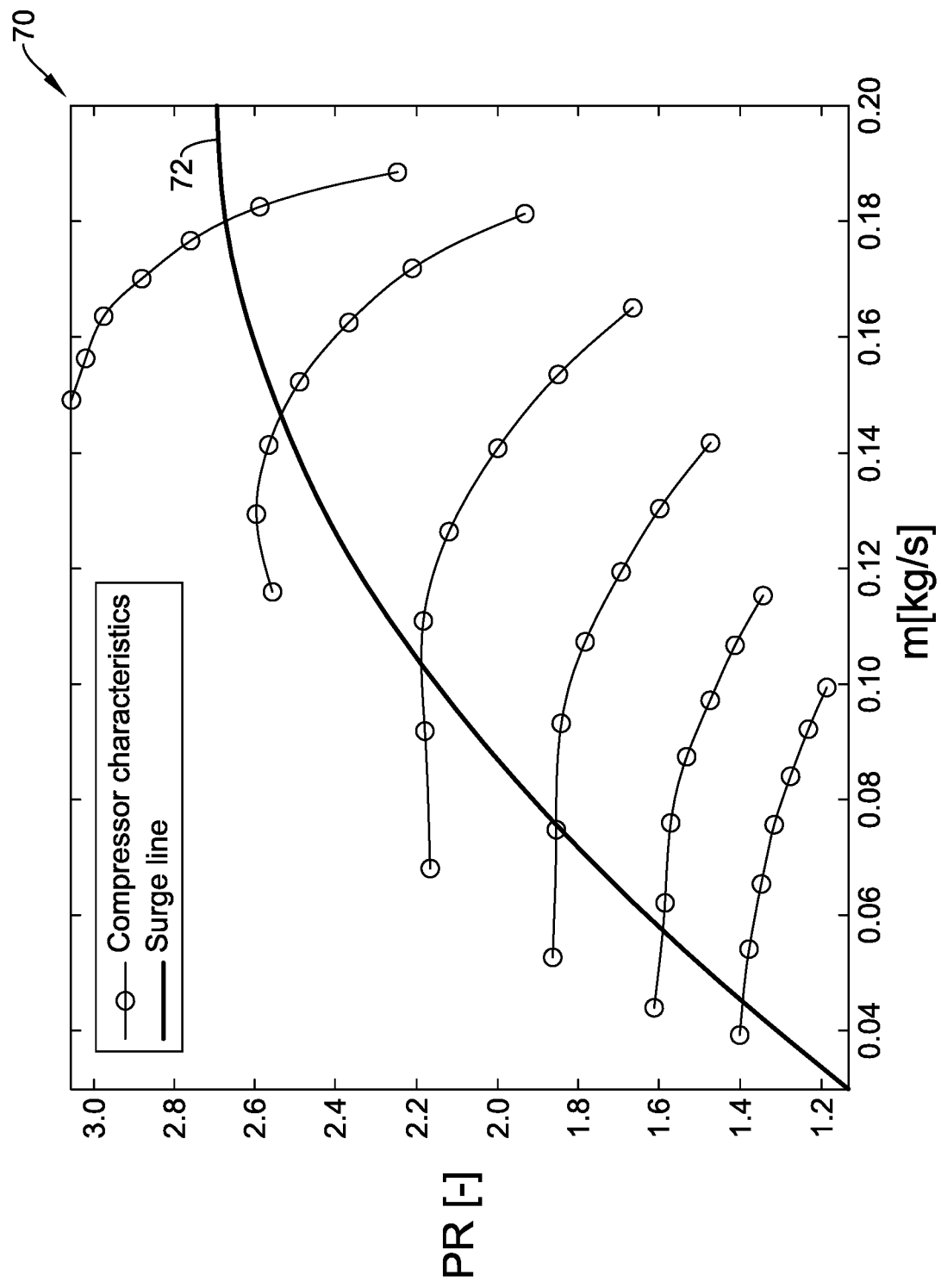
FIG. 7 is a schematic chart of an illustrative compressor map.

In developing the systematic model based approach, a surge limit may be defined by a surge line 72 on a compressor map 70, as shown for example in FIG. 7, which may be formally represented in a form of inequality:

$$\sigma\left(\frac{p_{o,c}}{p_{i,c}}, \dot{m}_c\right) \leq 0. \qquad (1)$$

Here function σ is a so-called oriented distance from the surge line 72. The function σ may be considered a value related to the control signal from an acceleration actuator and 0 may be considered a threshold.

Here $p_{o,c}/p_{i,c}$ may be a compressor pressure ratio (e.g., a pressure ratio of a compressor output pressure to compressor input pressure) and $\dot{m}_c$ may be a mass air flow (e.g., a corrected mass air flow or other mass air flow) through the compressor 28. The corrected mass flow may be the actual mass air flow value from the mass air flow sensor 38 recalculated to the situation of when the air at the air inlet 34 is at a standard pressure and temperature.

The exact position of the surge limit may depend on the actual ambient pressure and temperature and can be different at various altitudes (e.g., high altitude (low pressure) or low altitude (high pressure). This concept may add complexity to the problem.

The dots connected by lines in FIG. 7 visualize a relationship between the compressor corrected air mass flow and the compressor pressure ratio for several compressor corrected speed values. The individual lines may be so-called compressor speed-lines.

The compressor map 70 of FIG. 7 may be determined (e.g., measured) as follows. The compressor speed may be controlled automatically to a given set-point, usually by a feedback controller (e.g., the controller 18 or other controller) modulating a natural gas burner propelling a turbocharger on a test bench. For each speed set-point, the air outputted from the compressor 28 to the intake manifold 32 is gradually throttled with the throttle valve 30, thus increasing the pressure ratio and decreasing the air flow. When doing this, the compressor 28 may advance along a given speed-line from the right to the left. At some point, the compressor flow will start to oscillate indicating the surge onset. The oscillations may be sensed. The throttling may then be stopped at the point the oscillations were detected, or slightly beyond.

In some cases, the surge may reverse the flow and pressure ratio relationship and the flow may start to decrease when the compressor outlet pressure decreases. This is manifested by the fact the speed line changes slope direction at this area. Connecting the leftmost points of each of the speed-lines approximately marks the surge area boundary (e.g., the surge line 72). In practice, the actual limit can be shifted a little bit to the right from the speed-line endpoints, as shown in FIG. 7. The actual position of the surge line 72 may also be slightly different on the vehicle compared to the test bench because it is also affected by the factors such as piping geometry or by the volumes before and after the compressor 28.

As the throttle valve 30 may close faster than the compressor 28 may reduce its speed and cause the compressor 28 to operate at a surge condition; it may be desirable to reduce a speed at which the throttle valve 30 may close to ensure the compressor 28 does not operate at a surge condition. Additionally, other actuator positions may be modified to ensure the compressor 28 does not operate at the surge condition.

In some cases, the throttle valve 30 may be controlled to close at a slower rate to avoid operating the compressor 28 at a surge condition based on measuring the air mass flow and the pressure ratio across the compressor 28 or the compressor speed. The controller 18 may be configured to control the throttle valve 30 such that it may not be further closed when the measured air mass flow approaches a minimum value for the given speed-line (e.g., when σ approaches 0 from the right), the surge limit (e.g., the threshold).

This approach could be represented by a table of the minimum allowable air flow as a function of compressor speed and/or a pressure ratio across the compressor 28. For example, the controller 18 may control the throttle valve 30 with a first equation when a measured air flow is not predicted to cross a minimum allowed value and according to a second equation when the measured air flow is predicted to cross the minimum allowed value.

Even though this approach appears simple, it may be difficult to implement in practice because the time factor is missing in the considerations. During fast transient processes which may occur when closing the throttle valve 30 abruptly (e.g., when changing gears, braking quickly, and so forth), various delays may become important. As such, the approach may include adjusting a position of the throttle valve 30 predictively based on the dynamic model of the future behavior of various variables. Here, the predictive approach may be more efficient (e.g., from processing and operational standpoints) compared to pure feedback correction approaches.

This predictive approach may be described as having the $\sigma(t)$ function be either strictly negative $\sigma(t)<0$ or requiring its time derivative to be zero when $\sigma(t)=0$. That is, the controller 18 may control operation of the throttle valve 30 and/or other actuators according to a first equation and a second equation to ensure $\sigma(t)\leq 0$. Here t may be time. Let us formally divide the involved variables into three groups:

The first group may be external inputs, $u(t)$, to the air flow and turbo-speed dynamics. Example external inputs include, but are not limited to, an engine speed, throttle valve position, injection fuel quantity, ambient pressure and temperature, a waste-gate position, and so on. It may be convenient to split a vector of external inputs into a first sub-group of variables manipulated by the Engine Control Management, $v(t)$, and a second sub-group of variables which are exogenous disturbances, $w(t)$.

The second group may be state variable, $x(t)$, which may be mostly related to energy accumulation. The dynamics of the state variables may be described by first order differential equations (e.g., state space differential equations). An example first order differential equations may include an equation of compressor speed, which may be related to kinetic energy accumulated in the rotation of the turbocharger.

The third group may be air mass flow related variables, $z(t)$, which may not have any substantial dynamics of their own. These are known as algebraic variables of the respective Differential Algebraic Equations (DAE). Example algebraic variables of the respective DAE may include the pressures around the compressor, the air mass flow, and so on.

Using this definition, the approach may be can be formally described by the following equations:

$$\sigma(x(t), z(t), u(t)) \leq 0, \quad (2)$$

$$F_j(x(t), z(t), u(t)) = 0, \quad (3)$$

$$f_i(x(t), z(t), u(t)) = \frac{dx_i(t)}{dt}. \quad (4)$$

Equation (2) may represent the surge line (e.g., the surge line may be at a point when Equation (2) equals 0). Equation (3) may be a group of equations representing one or more algebraic equations relating the pressures, flows, and/or temperatures to the current values of the external inputs for a given compressor speed (e.g., turbo-speed). The one or more algebraic equations of Equation (3) may represent quasi-stationary values neglecting dynamics which may be much faster than the turbo-speed dynamics. Equation (4) may represent the integration of a state variable or state variables. In a surge model, Equation (4) may represent an accumulation of kinetic energy of the turbocharger and $x(t)$ may be its rotational speed (e.g., compressor speed). Formally, all the functions $\sigma$, F, f, may be assumed to be continuously differentiable.

When it happens that $\sigma(t)=0$ or is predicted to be 0 (e.g., operation of the compressor 28 hits or is predicted to hit the surge line), the throttle valve 30 and/or other actuators may be controlled such that operation of the compressor 28 be adjusted to a new speed line so as to operate in parallel with the surge line or to operate on the same speed line, but off of the surge line to the right. The controller 18 may be configured to control actuators (e.g., according to the second equation) such that the operating point of the compressor 28 moves away from or parallel to the surge line after the controller predicts the compressor will operate at a surge condition if a change is not made. This means that controller 18 may operate the air inlet system 25 such that the time derivative $d\sigma(t)/dt$ must be negative or maximum of zero (0) (e.g., the compressor may operate at points sliding along the surge line). This concept may be represented by Equation (5):

$$\sigma(t) = 0 \Rightarrow \frac{d\sigma(t)}{dt} \leq 0. \quad (5)$$

Equation (5) may be written using the chain rule (a rule for differentiating compositions of functions) as:

$$\sum_i \frac{\partial \sigma(t)}{\partial x_i(t)} f_i(x(t), z(t), u(t)) + \left(\frac{\partial \sigma(t)}{\partial z(t)}\right)^T \frac{dz(t)}{dt} + \left(\frac{\partial \sigma(t)}{\partial u(t)}\right)^T \frac{du(t)}{dt} \leq 0. \quad (6)$$

In Equation (6), $v^T u$ may represent an inner product of two column vectors. The unknown $dz(t)/dt$ may be expressed from the algebraic model equation $F_j=0$ which may provide the following values:

$$\frac{dz(t)}{dt} = -\left(\frac{\partial F(t)}{\partial z(t)}\right)^{-1} \left(\frac{\partial F(t)}{\partial u(t)} \frac{du(t)}{dt} + \frac{\partial F(t)}{\partial x(t)} f(x(t), z(t), u(t))\right). \quad (7)$$

Matrix inversion, here, may be guaranteed to exist assuming the function F is invertible with respect to z. This may be reasonable because flows and pressures are uniquely determined for given turbo-speed $x(t)$ (e.g., compressor speed) and external inputs values $u(t)$. As a result, a Jacobian matrix of Equation (5) may be a regular matrix by the Inverse function theorem.

As a result, the following inequality $d\sigma(t)/dt \leq 0$ may be equivalent to the following limit on the time derivatives of the external inputs:

$$\left(\frac{\partial \sigma(t)}{\partial u(t)} - \frac{\partial \sigma(t)}{\partial z(t)} \left(\frac{\partial F(t)}{\partial z(t)}\right)^{-1} \frac{\partial F(t)}{\partial u(t)}\right) \frac{du(t)}{dt} \leq \quad (8)$$

-continued $$\frac{\partial \sigma(t)}{\partial z(t)}\left(\frac{\partial F(t)}{\partial z(t)}\right)^{-1}\frac{\partial F(t)}{\partial x(t)}f(x(t),z(t),u(t)) - \frac{\partial \sigma(t)}{\partial x(t)}f(x(t),z(t),u(t)).$$

This linear inequality may have the form as represented in Equation (9), below, (e.g., a certain weighted sum of the time derivatives of all external inputs is less than or equal to a limit):

$$\sum_{k=1}^{K} a_k(t)\frac{du_k(t)}{dt} \le b(t). \tag{9}$$

Weights $\sigma_k(t)$ and the limit $b(t)$ may be time dependent because they depend on $x(t)$ and $u(t)$. This linear inequality may represent a projection of the surge line to the space of all external inputs. In other words, the operating points of the compressor 28, for some or all external inputs, may slide along the surge line or off the line (e.g., to the right) to satisfy the above inequality.

Now assume that the position of the throttle valve 30 may be the first external input $u_1(t)$ and $a_1(t)<0$. Then a maximum throttle valve position rate of change to avoid a surge operating condition of the compressor 28 may be determined based on the following inequality:

$$\frac{du_1(t)}{dt} \ge \frac{1}{a_1(t)}\left(b(t) - \sum_{k=2}^{K} a_k(t)\frac{du_k(t)}{dt}\right). \tag{10}$$

Note that in Equation (10) closing the throttle valve 30 means decreasing $u_1(t)$ (e.g., that is $u_1(t)$ may be a negative value). Similar techniques may be utilized for other external inputs.

In some cases, one or more of the factors $a_k(t)$, $b(t)$ may be calculated in real time and in others, one or more of the factors $a_k(t)$, $b(t)$ may not be calculated in real time. When one or more of the factors $a_k(t)$, $b(t)$ are not calculated in real time, the factors $a_k(t)$, $b(t)$ may be pre-calculated (e.g., calculated off-line when the engine system 10 is not in use or in a controller not part of the engine system 10) from the above calculations for a sufficiently dense grid of values u, x, and preparing a lookup table or interpolation polynomials may be prepared for the factors $a_k(t)$, $b(t)$.

In some cases, Equation (10) may provide an exact or a substantially exact representation of the maximum throttle valve closing rate under all, or virtually all, conditions, including, but not limited to, various ambient temperatures and ambient pressures because the factors $a_k(t)$, $b(t)$ may depend on such conditions and/or parameters.

The derived result of Equation (10) indicates that when a surge limit has been reached, the time derivative of the position of the throttle valve 30 may be on one side of a threshold (e.g., a surge limit or other threshold based on a surge limit and/or control signal) and when the surge limit has not been reached, the time derivative of the position of the throttle valve 30 may be on another side of the threshold. The location of the time derivative of the position of the throttle valve 30 relative to the threshold may depend on the time derivatives of all, or substantially all, other external inputs and/or the values of those inputs (e.g., ambient pressure, ambient temperature, and so on), but this is not required. As a result, effects of ambient conditions may be accounted-for. The location of the time derivative of the position of the throttle valve 30 relative to the threshold may also depends on the turbo-speed value (e.g., compressor speed), $x(t)$, as well as other state-variables.

The control of the throttle valve 30 and surge protection do not necessarily need to be integrated together. For example, the control of the throttle valve 30 may be separate from the surge protection control as the surge protection control may adjust one or more other actuators (e.g., wastegate actuators, and so on). Alternatively, the algorithm may directly override the driver pedal position by modifying a position of the throttle valve according to the second equation that may simulate a slower release of the driver pedal.

The same inequality may be used to modify control signals to actuators other than the throttle valve 30. In some cases, a diesel engine may not have a throttle valve, such that an engine torque may be controlled by fuel quantity injection alone. In such cases, there is, however, a possibility of developing a surge if the engine speed decreases too quickly. This is a problem known from, e.g., hydraulic excavators where the throttle-less diesel engine can be used to propel a hydraulic power unit. In these applications, the engine may be abruptly connected and disconnected from the hydraulic pump to control the hydraulic pressure in a certain range. During these events the diesel engine speed deceleration may result in operating the compressor 28 at the surge condition.

Figure 8:
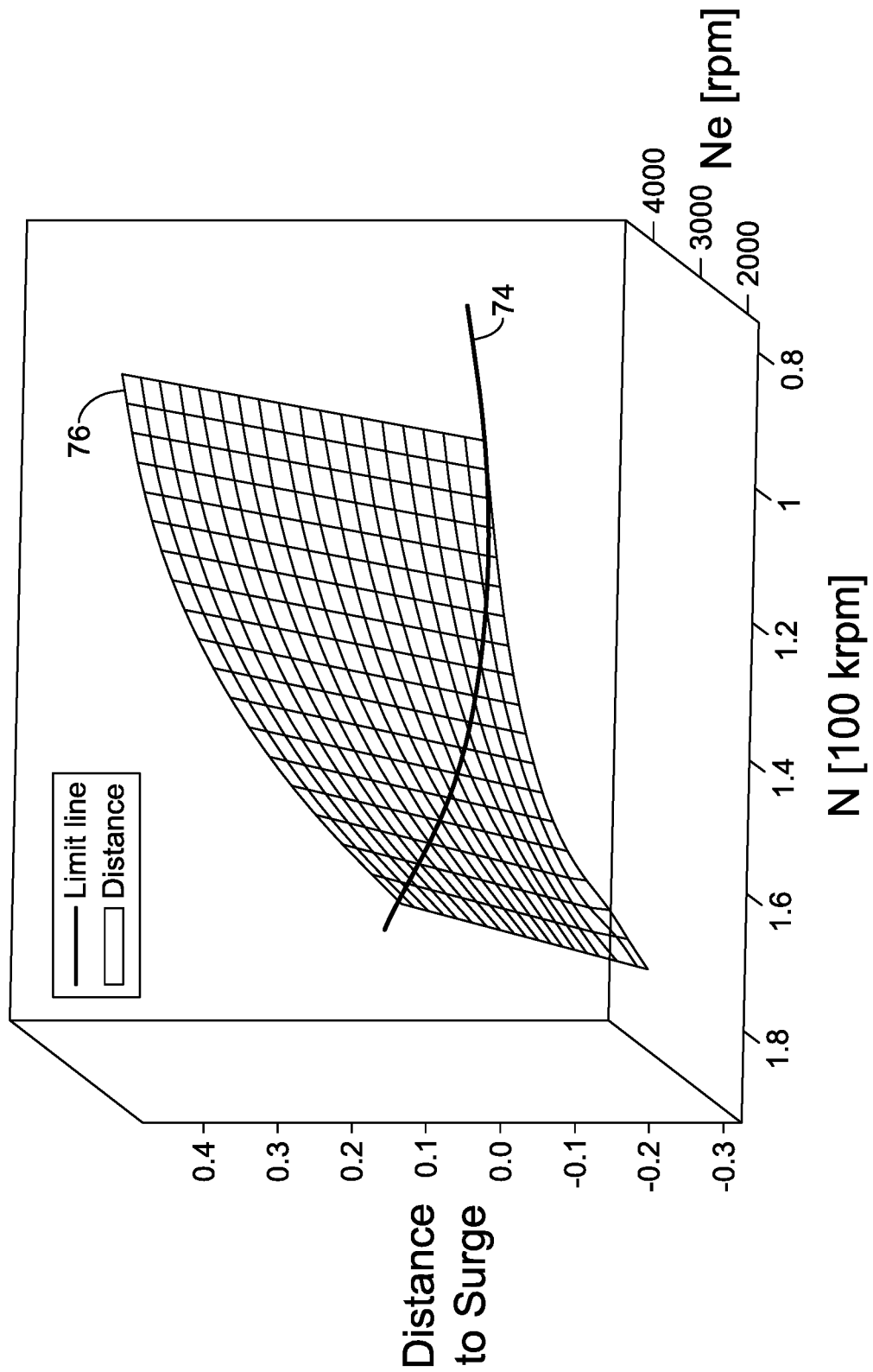
FIG. 8 is a schematic chart of an illustrative engine speed as a function of compressor speed.

Further, it is clear that the above inequality of Equation (10) may be valid for cases when the time derivative of $du_1(t)/dt$ actually stands for engine deceleration limit (e.g., a threshold) or one or more other parameter, rather than a rate of change of throttle valve position or other parameter. This is depicted in FIG. 8, which shows the dependency of a minimum allowed engine speed, $N_e(t)$, as a function of an actual compressor speed, $N(t)$. The line 74 in FIG. 8 may be representative of a compressor or turbo speed limit (e.g., a threshold) evaluated by solving $\sigma$ as a function of engine speed, considering all other inputs, u, to be constant. The mesh surface 76 in FIG. 8 may be $\sigma$ (e.g., a distance from the line 74) and may be obtained by simulating the model over a range of engine speeds and some u. External inputs other than actual compressor speed may be assumed to have certain constant values.

The result depicted in FIG. 8 may be used for controlling an engine speed such that a rate of engine deceleration does not cross from a first side to a second side of the engine deceleration limit, which may be parameterized by the current compressor speed. It may follow that the engine 12 may not be allowed to directly drop to an idle speed value according to a first equation when disconnected from the hydraulic pump and the controller 18 predicts the rate of engine deceleration will pass the engine deceleration limit, but will instead decelerate according to a second equation at a slower rate to prevent causing a compressor surge.

In some cases, the inequality of Equation (10) may be used to modify more than one control signal (e.g., actuator control signals 68). Assuming there are a total of K control signals (e.g., external inputs) and H control signals may be modified, then one has the following inequality:

$$\sum_{h=1}^{H} a_h(t)\frac{du_h(t)}{dt} \ge b(t) - \sum_{k=H+1}^{K} a_k(t)\frac{du_k(t)}{dt}. \tag{11}$$

When configuring a controller (e.g., the controller 18) to modify more than one actuator control signal 68 to address a predicted surge condition, an approach may be to set up which actuator control signals 68 are to be modified and/or in what order the actuator control signals 68 are to be modified when a surge condition has been predicted. That is, a first actuator control signal 68 may be modified and then a second actuator control signal 68 may be modified, and so on in a sequential manner until a surge condition is no longer being predicted. In one example, a controller 18 may modify a waste-gate position actuator control signal first to avoid a predicted surge condition by causing the waste-gate to open and a control signal controlling a position of a throttle valve 30 or a control signal otherwise controlling an engine deceleration may be sent if the modified control signal to the waste-gate position actuator is insufficient to prevent the predicted surge condition.

Figure 9:
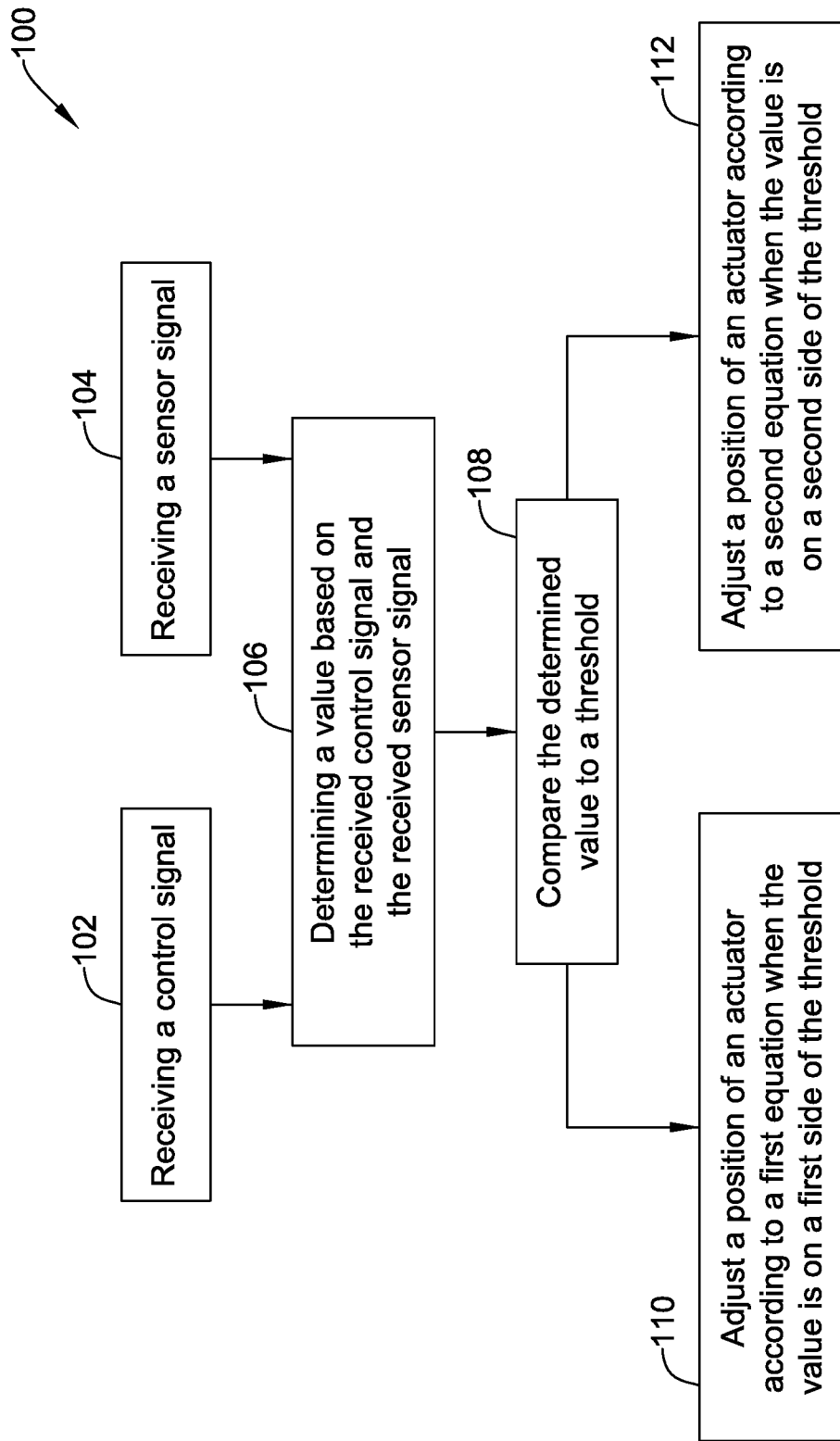
FIG. 9 is a schematic flow diagram showing an illustrative approach of controlling an engine system.

FIG. 9 depicts an illustrative approach 100 for controlling the operation of the engine system 10. In operation, the controller 18 may be configured to receive 102, via the input port 50, one or more control signals and/or receive 104, via the input port 50, one or more sensor signals. In one example, the received control signal may be an accelerator actuator (e.g., accelerator pedal or other accelerator actuator) control signal from a user adjusting the accelerator. The sensor signal may be any type of sensor signal from any type of sensor, including, but not limited to, the mass air flow sensor 38, the inlet pressure sensor 40, the outlet pressure sensor 42, the inlet temperature sensor 44, the throttle inlet temperature sensor 46, the MAP sensor 48, an ambient temperature sensor, an ambient pressure sensor, and/or one or more other sensors.

In the approach 100, a value based on the received accelerator actuator control signal and the received sensor signal may be determined 106. The value may be a value of any type of parameter related to the operation of the engine system 10. In one example, the value may be one or more of a surge line, a distance from a surge line ($\sigma$), an operating point of the compressor on a compressor map, a rate of change of a throttle valve position, engine deceleration rate, a rate of change of a position of an acceleration actuator, a compressor speed, a pressure downstream of the compressor, the flow rate of air flow through the compressor, ambient temperature and/or pressure, and so forth. Once the value has been determined, the value may be compared 108 to a threshold. The threshold may be a point at which if crossed, the compressor 28 may operate at a surge condition. If the value is on a first side of the threshold (e.g., when the value is not indicative of the compressor operating in a surge condition), the controller 18 may be configured to adjust 110 a position of one or more actuators (e.g., a position of the throttle valve 30, the waste-gate, and so forth) according to a first equation. If the value is on a second side of the threshold (e.g., when the value is indicative of the compressor 28 operating in a surge condition), the controller 18 may be configured to adjust 112 a position of one or more actuators according to a second equation to prevent the compressor from operating at a surge condition.

In a further example, the controller 18 may be configured to calculate an actual position of the throttle valve 30 and/or other actuator based on the driver pedal (e.g., an acceleration actuator) position, and send a control signal to the throttle valve 30 to set the position of the throttle valve 30 according to a first equation (e.g., a desired position of the throttle valve as indicated by the driver pedal position or rate of adjustment thereof). This position of the throttle valve 30 may be overridden based on whether a predicted value related to a compressor operating condition exceeds a threshold, leading to a slower closing of the throttle valve 30 according to a second equation (e.g., used to set the position of the throttle valve 30 when the position of the throttle valve 30 according to the first equation would cause a surge). This approach may modify the desired throttle position according to the first equation. However, it happens for only a shortest possible period of time and may thus be tolerable.

As discussed above, an approach for a model based surge protection may be noted. The approach may be based on projecting a surge line onto an actuator space (e.g., set points for one or more actuators). The surge line may be mapped to a surface in the actuator space. When hitting this surface (e.g., the mesh surface 76 in FIG. 8 or other surface), the controller 18 may be configured to maintain actuator positions such that the positioning of the monitored and/or controlled actuators result in staying on the surface or moving off of the surface to a non-surge side of the surge line. The surface position may depend on state variables (e.g., compressor or turbo speed, and so on) and/or exogenous inputs including, but not limited to, ambient pressure and ambient temperature. This means that time derivatives of the actuators may be constrained by a single linear time-varying inequality, such as Equation (10). Thanks to this mapping, the compressor surge can be prevented by preventing movement of actuators that are predicted to cause a compressor surge in view of other inputs. Further, the approach may be based on a DAE model representing the fast dynamics of an engine system with algebraic equations rather than differential equations.

To recap, the disclosure may include an engine system having an air intake manifold, a compressor for providing an airflow to the air intake manifold, and a controller connected to the intake manifold and the compressor. The controller may be configured receive a control signal and control airflow from the compressor to the intake manifold. The controller may be configured to control airflow from the compressor to the intake manifold based on the control signal received according to a first equation when a value related to the control signal is on a first side of a threshold. The controller may be configured to control airflow from the compressor to the intake manifold based on the control signal received according to a second equation when the value related to the control signal has crossed from the first side of the threshold to a second side of the threshold.

Further, the threshold used by the controller may be a surge line on a compressor map of flow rate of the air flow from the compressor to the intake manifold versus a pressure ratio of a pressure at an output of the compressor over a pressure at an input of the compressor.

The value, which may be determined by the controller and/or may be a value of a sensed parameter, may be a predicted value of a function dependent on a flow rate of the air flow from the compressor to the intake manifold and a pressure ratio of a pressure at an output of the compressor over a pressure at an input of the compressor.

The control signal received by the controller may be indicative of a position of an acceleration actuator. Further, the value related to the control signal may be a function of a change of rate in the position of the acceleration actuator.

The engine system may further include a sensor sensing a compressor speed and providing the compressor speed to the controller as an input. In some cases, the value related to the control signal may be a function of the compressor speed.

The engine system may include a sensor sensing a pressure downstream of the compressor. In some cases, the value related to the control signal may be a function of the pressure downstream of the compressor.

The engine system may include a sensor sensing a flow rate of air flow through the compressor. In some cases, the value related to the control signal may be a function of the flow rate of air flow through the compressor.

The engine system may include one or both of a sensor sensing an ambient pressure and a sensor sensing an ambient temperature. In some cases, the value related to the control signal may be a function of one or both of the ambient pressure and the ambient temperature.

In some cases, the controller is configured to determine the value from a look up table calculated when an engine of the engine system is off-line based on inputs received from sensors when the engine is on-line.

In some cases, the controller may be configured to output actuator control signals to a plurality of actuators of an engine of the engine system to control the air flow from the compressor to the intake manifold, and limit adjustment of the actuator control signals such that the value related to the control signal does not cross from the first side of the threshold to the second side of the threshold.

In some cases, the controller may be configured to output actuator control signals to one or both of a throttle actuator and a waste gate actuator when controlling airflow from the compressor to the intake manifold based on the control signal received according to the second equation.

The controller of the engine system may be configured to adjust actuator control signals in a sequential manner when the controller is configured to control airflow from the compressor to the intake manifold based on the control signal received according to the second equation.

The engine system may include a throttle configured to modulate an amount of air flow from the compressor to the intake manifold. Further, for a same inputted control signal, the controller is configured to control a position of the throttle differently when controlling air flow from the compressor to the intake manifold according to the second equation than when controlling air flow from the compressor to the intake manifold according to the first equation.

An engine controller may be configured to control air flow between a compressor and an intake manifold based on an accelerator actuator position. The engine controller may include an input port for receiving a compressor air flow signal that represents a measure of air flow through the compressor, a compressor inlet pressure signal that represents a measure of pressure at an inlet of the compressor, a compressor outlet pressure signal that represents a measure of pressure at an outlet of the compressor, and an accelerator actuator signal that represents a measure of a position of an accelerator actuator. The engine controller may further include an output port, a processor operatively coupled to the input port and the output port; and a memory having instructions stored therein. The instructions stored in the memory may be executable by the processor to determine a value based on the accelerator actuator signal and one or more of the compressor air flow signal, the compressor inlet pressure signal, and the compressor outlet pressure signal, compare the determined value to a threshold, and provide one or more control signals via the output port to control an air flow between a compressor and an intake manifold based on a first equation when the determined value is on a first side of the threshold and based on a second equation when the determined value is on a second side of the threshold.

In some cases, the input port may be configured to receive signals related to ambient conditions and the value is determined based the signals related to ambient conditions.

The processor of the engine controller may be configured to determine an actual value and a predicted value when determining the value includes, compare the determined predicted value to the threshold, and provide one or more control signals via the output port according to one of the first equation and the second equation such that the actual value does not cross the threshold based on the comparison of the predicted value to the threshold.

In some cases, the output port may be configured to output a control signal to an intake manifold actuator. For a same received accelerator actuator signal, a different control signal is provided via the output port to the intake manifold actuator when controlling air flow from the compressor to the intake manifold according to the second equation than when controlling air flow from the compressor to the intake manifold according to the first equation.

In some cases, the threshold may be a surge line on a compressor map of flow rate of the air flow from the compressor to the intake manifold versus a pressure ratio of a pressure at an output of the compressor over a pressure at an input of the compressor.

An approach for controlling air flow in an engine system between a compressor and an intake manifold based on an accelerator actuator position may include receiving an accelerator actuator control signal and receiving a sensor signal including a measure of a parameter related to operation of an engine. Then, determining a value based on the received accelerator actuator control signal and the received sensor signal and comparing the value to a threshold. Further, the approach may include adjusting a position of an actuator of an engine system based on the accelerator actuator control signal according to a first equation when the value is on a first side of the threshold and according to a second equation when the value is on a second side of the threshold. The threshold may be a surge line on a compressor map of flow rate of air flow from the compressor to the intake manifold versus a pressure ratio of a pressure at an output of the compressor over a pressure at an input of the compressor.

In some cases, the value is a predicted value of a function dependent on a flow rate of the air flow from the compressor to the intake manifold and a pressure ratio of a pressure at an output of the compressor over a pressure at an input of the compressor.

A surge protection device may include a compressor or compressors providing the air pressure for an internal combustion engine, a surge line specification for each compressor used, an engine control system operating one or more actuator positions directly or indirectly affecting the compressor air mass flow and compressor pressure ratio and compressor speed, a vector space where any point answers a set of positions for the actuators, and a mechanism which uses the surge line projected to a time-variable constraining surface in the actuator space to prevent actuator moves beyond the surface.

The surge protection device may include a turbo speed sensor sensing the compressor speed. The constraining surface in the actuator space may be parameterized by the sensed compressor speed.

The surge protection device may include a pressure sensor (e.g., a boost pressure sensor) sensing pressure at any location downstream the compressor. The constraining surface in the actuator space may be parameterized by the sensed pressure value downstream the compressor.

The surge protection device may include an air mass flow sensor sensing air mass flow through the compressor. The constraining surface in the actuator space may be parameterized by the sensed air mass flow through the compressor.

The surge protection device may include a throttle modulating the air flow from the compressor. A throttle position modification not answering the driver's demand at situations the throttle position would cause the actuators position to cross the constraining surface.

The surge protection device may include sensors sensing the ambient pressure and temperature. The constraining surface in the actuator space may be parameterized by the sensed ambient pressure and temperature.

The surge protection device may include an automatic calibration tool which calculates the parameters of the constraining surface based on the differential and algebraic equations of the air flow, and a mechanism which transfers the parameterization of the constraining surface to the on board engine control systems.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to incorporate all such variations and modifications.

What is claimed is:

1. An engine system comprising:
   an intake manifold;
   a compressor for providing an air flow to the intake manifold; and
   an electronic controller connected to the intake manifold and the compressor, the electronic controller is configured to:
      control a position of an actuator controlling airflow from the compressor to the intake manifold based on a control signal received according to a first non-zero rate of change of the position of the actuator when a value related to the control signal is on a first side of a threshold;
      control the position of the actuator controlling airflow from the compressor to the intake manifold based on the control signal received according to a second non-zero rate of change of the position of the actuator when the value related to the control signal has crossed from the first side of the threshold to a second side of the threshold, the second non-zero rate of change of the position of the actuator is slower than the first non-zero rate of change of the position of the actuator; and
   wherein the electronic controller is configured to control the position of the actuator based on the following equation:

$$\sum_{h=1}^{H} a_h(t) \frac{du_h(t)}{dt} \geq b(t) - \sum_{k=H+1}^{K} a_k(t) \frac{du_k(t)}{dt},$$

where K is a total number of control signals sent to actuators, H is a number of modifiable control signals sent to actuators of the K control signals, t is a unit of time, $a_h(t)$ and $a_k(t)$ are weighting values, $u_h(t)$ and $u_k(t)$ are external input values, and b(t) is a limit value.

2. The engine system of claim 1, wherein the threshold is a surge line on a compressor map of flow rate of the air flow from the compressor to the intake manifold versus a pressure ratio of a pressure at an output of the compressor over a pressure at an input of the compressor.

3. The engine system of claim 1, wherein the value is a predicted value of a function dependent on a flow rate of the air flow from the compressor to the intake manifold and a pressure ratio of a pressure at an output of the compressor over a pressure at an input of the compressor.

4. The engine system of claim 1, wherein:
   the control signal is a position of an acceleration actuator; and
   the value related to the control signal is a function of a change of rate in the position of the acceleration actuator.

5. The engine system of claim 1, further comprising:
   a sensor sensing a compressor speed and providing the compressor speed to the electronic controller as an input;
   the value related to the control signal is a function of the compressor speed.

6. The engine system of claim 1, further comprising:
   a sensor sensing a pressure downstream of the compressor; and
   the value related to the control signal is a function of the pressure downstream of the compressor.

7. The engine system of claim 1, further comprising:
   a sensor sensing a flow rate of air flow through the compressor; and
   the value related to the control signal is a function of the flow rate of air flow through the compressor.

8. The engine system of claim 1, further comprising:
   a sensor sensing an ambient pressure; and
   a sensor sensing an ambient temperature; and
   the value related to the control signal is a function of one or both of the ambient pressure and the ambient temperature.

9. The engine system of claim 1, wherein the electronic controller is configured to determine the value from a look up table calculated when an engine of the engine system is off-line based on inputs received from sensors when the engine is on-line.

10. The engine system of claim 1, wherein the electronic controller is configured to:
    output the actuator modifiable control signals to the actuators of an engine of the engine system to control the air flow from the compressor to the intake manifold; and
    limit adjustment of the modifiable actuator control signals such that the value related to the control signal does not cross from the first side of the threshold to the second side of the threshold.

11. The engine system of claim 10, wherein the electronic controller is configured to output the modifiable actuator control signals to one or both of a throttle valve actuator and a waste gate actuator when controlling airflow from the compressor to the intake manifold based on the control signal received according to the second non-zero rate of change of the position of the actuator.

12. The engine system of claim 10, wherein the electronic controller is configured to adjust the modifiable actuator control signals in a sequential manner when the electronic controller is configured to control airflow from the compressor to the intake manifold based on the control signal received according to the second non-zero rate of change of the position of the actuator.

13. The engine system of claim 1, further comprising:
a throttle valve configured to modulate an amount of air flow from the compressor to the intake manifold; and
wherein for a same inputted control signal, the electronic controller is configured to control a position of the throttle valve differently when controlling air flow from the compressor to the intake manifold according to the second non-zero rate of change of the position of the actuator than when controlling air flow from the compressor to the intake manifold according to the first non-zero rate of change of the position of the actuator.

* * * * *